(12) United States Patent
Veeh

(10) Patent No.: US 9,979,254 B2
(45) Date of Patent: May 22, 2018

(54) COOLABLE MACHINE HOUSING

(75) Inventor: Michael Veeh, Kleinrinderfeld (DE)

(73) Assignee: Baumueller Nuernberg GmbH, Nuernberg (DE)

( * ) Notice: Subject to any disclaimer, the term of this patent is extended or adjusted under 35 U.S.C. 154(b) by 690 days.

(21) Appl. No.: 14/551,307

(22) PCT Filed: May 24, 2012

(86) PCT No.: PCT/EP2012/002216
§ 371 (c)(1),
(2), (4) Date: Oct. 7, 2015

(87) PCT Pub. No.: WO2013/174406
PCT Pub. Date: Nov. 28, 2013

(65) Prior Publication Data
US 2016/0043607 A1   Feb. 11, 2016

(51) Int. Cl.
*H02K 5/20* (2006.01)
(52) U.S. Cl.
CPC .................................. *H02K 5/20* (2013.01)
(58) Field of Classification Search
CPC ....................................................... H02K 5/20
USPC .......................................................... 310/54
See application file for complete search history.

(56) References Cited

U.S. PATENT DOCUMENTS

| | | | |
|---|---|---|---|
| 7,576,458 B2 | 8/2009 | Wehner et al. | |
| 2003/0016894 A1* | 1/2003 | Miyazaki | B60B 27/0084 384/544 |
| 2006/0226718 A1 | 10/2006 | Yang | |
| 2008/0223557 A1* | 9/2008 | Fulton | H02K 5/20 165/104.33 |
| 2016/0043607 A1 | 2/2016 | Veeh | |

FOREIGN PATENT DOCUMENTS

| | | |
|---|---|---|
| CA | 2872838 A1 | 11/2013 |
| CN | 1848610 A | 10/2006 |
| DE | 29722432 U1 | 2/1998 |
| DE | 20216114 U1 | 3/2004 |
| DE | 10247199 A1 | 4/2004 |
| EP | 0924839 A1 | 6/1999 |
| EP | 1554793 B1 | 11/2006 |
| RU | 85768 U1 | 8/2009 |
| SU | 568996 A1 | 8/1977 |
| UA | 19483 A | 12/1997 |

\* cited by examiner

*Primary Examiner* — Terrance Kenerly
(74) *Attorney, Agent, or Firm* — Laurence A. Greenberg; Werner H. Stemer; Ralph E. Locher

(57) ABSTRACT

A coolable machine housing of an electric machine has a housing shell formed as an extruded section with integrated cooling ducts. The housing shell can be covered at the end faces by bearing end plates. The axially extending cooling ducts communicate with one another through connecting ducts. The cooling ducts in the extruded housing shell extend in pairs as cooling duct pairs between the shell end faces. The connecting ducts are boreholes that penetrate the outer wall by way of borehole openings that are closed by way of closing elements.

11 Claims, 5 Drawing Sheets

COOLABLE MACHINE HOUSING

CROSS-REFERENCE TO RELATED APPLICATION

This application is a continuation, under 35 U.S.C. § 120, of copending international application No. PCT/EP2012/002216, filed May 24, 2012, which designated the United States; the prior application is herewith incorporated by reference in its entirety.

BACKGROUND OF THE INVENTION

Field of the Invention

The invention relates to a coolable machine housing for receiving stator components and rotor components of an electrical machine.

Commonly assigned U.S. Pat. No. 7,576,458 B2 and its counterpart European Patent No. EP 1 554 793 B1 describe a coolable housing shell for an electrical machine. The housing shell is coated with dipping varnish. A number of cooling ducts are integrated in pairs in the housing shell that is produced as an aluminum casting and the cooling ducts extend between the cylindrical inner wall and the outer wall on the housing shell in the longitudinal direction of the shell. The cooling ducts that are provided in the corner regions of the housing shell are closed at one of the shell end faces of the housing shell by means of a casting wall and can be accessed on the opposite lying shell end face from the exterior, wherein the shell end faces can be covered at the end by means of bearing end plates. The cooling ducts communicate with one another by way of connecting ducts that extend in the transverse direction of the shell and the ducts are formed by means of sand cores during the process of casting the housing shell.

In order to ensure that the process proceeds in a reliable manner, it is necessary in the case of the prior art casting housing to reliably position the sand cores since otherwise an undesirable high rate of reject parts could arise as a result of the housing shell being insufficiently leak-tight. Any lack of leak-tightness of this type is in part only established on the finished end product and consequently involves costly corrections or rather repair work.

SUMMARY OF THE INVENTION

It is accordingly an object of the invention to provide a cooled machine housing which overcomes the above-mentioned and other disadvantages of the heretofore-known devices and methods of this general type and therefore to provide a coolable machine housing that has an improved housing shell.

With the foregoing and other objects in view there is provided, in accordance with the invention, a coolable machine housing for receiving stator components and rotor components of an electrical machine. The novel machine housing comprises:

a housing shell being an extruded section formed with an inner wall, an outer wall, a first shell end face and a second shell end face opposite the first shell end face;

bearing end plates configured to cover the housing shell at each of the first and second shell end faces;

the extruded section of the housing shell having integrated therein a plurality of axial cooling ducts between the inner wall and the outer wall, the cooling ducts extending in pairs as cooling duct pairs in a longitudinal direction of the housing between the shell end faces; and the cooling ducts communicating with one another by way of connecting ducts that extend in a transverse direction of the housing, the connecting ducts being boreholes that penetrate the outer wall as borehole openings which are closed by closing elements.

In other words, the housing shell is formed or rather produced from an extruded section and the cooling ducts are integrated in pairs as cooling duct pairs into the extruded section. Connections between individual cooling ducts of the cooling duct pairs are embodied as boreholes that with their borehole openings penetrate the outer wall of the housing shell at exposed sites. The borehole openings of the corresponding connecting ducts between the housing transverse boreholes that form the cooling ducts are closed by means of closing elements, preferably in the form of closing screws.

The housing shell is suitably designed in such a manner that four corner regions where the wall is comparatively thick are formed and wall regions that have a comparatively thin wall are arranged between the corner regions. The outer wall of the housing shell has for this purpose an almost square cross section, in other words is itself embodied in the shape of a rectangle that has preferably flattened outer corners, whereas the inner wall is essentially cylindrical or has at least a likewise almost square cross section with rounded inner corner regions. In an expedient manner, the cooling ducts are incorporated in the comparatively thick-walled corner regions that are produced thereby, wherein a cooling duct pair is provided in each corner region.

The cooling ducts enter at the two shell end faces of the housing shell or rather enter or exit at the two shell end faces of the housing shell. Each cooling duct pair forms a duct separating web or shell separating web between the cooling ducts. Each of these duct separating webs extends uninterrupted in the longitudinal direction of the housing starting from a first shell end face as far as the opposite lying second shell end face and is only interrupted at that site by forming a through-going duct. The connecting ducts that are embodied as boreholes are preferably provided in the region of the first shell end face that in a suitable manner forms the A-face in relation to the machine housing, whereas the through-going boreholes are provided on the opposite lying second shell end face that then represents the B-face in relation to the machine housing.

The borehole that forms the respective connecting duct penetrates the outer wall starting from the borehole opening, which is formed thereby, and also penetrates the duct separating web of the cooling duct pair that lies closest to the borehole opening and extends in the transverse direction of the housing through the comparatively thin-walled shell region of the housing shell in order to issue into the closest-lying cooling duct of the cooling duct pair in the adjacent corner region of the housing shell. In this manner, a total of three boreholes are formed in a suitable manner to form a corresponding minimum number of connecting ducts.

The cooling ducts of each cooling duct pair on the shell end face lying opposite the boreholes or rather connecting ducts, the shell end face being the B-face in relation to the machine housing, are connected by way of the through-going ducts that are incorporated at that site in the duct separating webs. A duct system having mutually connected cooling ducts is formed in this manner within the housing shell and a cooling medium flows through the cooling ducts in their flow direction one after the other.

The cooling medium enters by way of an inlet opening that is provided preferably in the region of the first shell end face (A-face) and exits by way of an outlet opening that is preferably likewise provided at that site. The inlet opening and outlet opening penetrate in turn the outer wall of the housing shell but issue into different cooling ducts of two adjacent cooling duct pairs. The inlet opening and outlet opening are preferably arranged on the same shell face of the housing shell that is suitably of a rectangular shape and consequently has a square cross section, and the openings are spaced apart from one another, the spacing of which is equal to the distance between two cooling ducts of adjacent cooling duct pairs.

The shell end face-side inlet and outlet openings of the cooling ducts are preferably covered in pairs by means of planar seals. Four planar seals are thus provided in a suitable manner in each case both on the first shell end face (A-face) and also on the second shell end face (B-face) of the housing shell.

In accordance with a particularly preferred embodiment, corrugated-like depressions are incorporated into the shell end faces that are formed so to speak in the form of flanges or flange surfaces and the contour of the corrugation of the depressions is tailored to suit the outer contour of the planar seals. In the assembled state, the planar seals lie in these depressions and are pressed by means of the bearing end plates of the machine housing against the housing shell and also thereby are suitably deformed in an elastic manner so that a particularly reliable sealing effect is ensured.

The cooling ducts that are closed in a sealing manner at the end face by means of the planar seals are consequently selectively connected one to the other on the one hand only by way of the connecting ducts that extend in the transverse direction of the housing and also on the other hand on the opposite lying shell end face of the housing shell by way of the respective through-going holes or through-going ducts in the duct separating webs. A cooling medium that enters by way of the inlet opening into the ducting system that is formed thereby flows, as a result of the corresponding arrangement of cooling ducts in pairs and the connecting ducts and also the through-going ducts, first through a cooling duct of a first cooling duct pair and as a result of a deflection by way of the through-going duct through the other cooling duct of the same cooling duct pair in order subsequently to flow through one of the connecting ducts to the next cooling duct pair. In this manner, cooling medium flows through all the cooling ducts of the cooling duct pairs one after the other and subsequently flows out by way of the outlet opening.

The advantages that are achieved by means of the invention reside particularly in the fact that a reliable cooling process is achieved whilst maintaining a high degree of leak-tightness of the cooling system by virtue of using a housing shell that is produced from an extruded section with integrated cooling ducts and connecting ducts in the form of incorporated boreholes that extend in a transverse manner with respect to the cooling ducts. In addition, it is possible to achieve small manufacturing tolerances and good surface qualities. In conjunction with the individual planar seals that seal the cooling ducts at the end face, the bearing end plates assume the function and task of a hitherto conventional sealing ring. Moreover, the housing shell that is embodied as an extruded section is comparatively less porous than a casting and does not comprise any imperfections or at least only comprises comparatively few imperfections and consequently has practically no material defects.

Other features which are considered as characteristic for the invention are set forth in the appended claims.

Although the invention is illustrated and described herein as embodied in a coolable machine housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
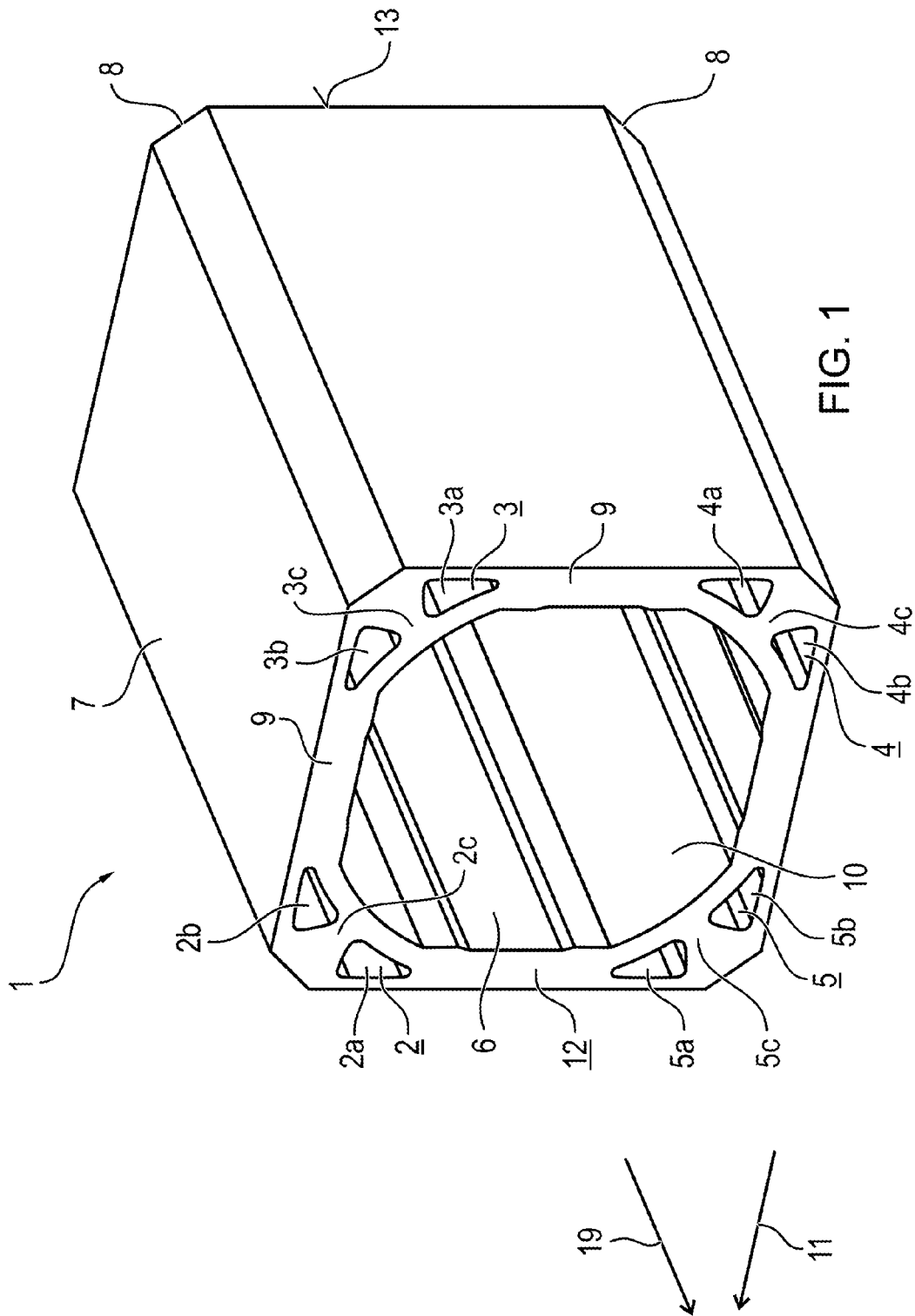
FIG. 1 is a perspective view of a coolable housing shell of an electrical machine formed with axial cooling ducts.

Referring now to the figures of the drawing in detail and first, particularly, to FIG. 1 thereof, there is shown a housing shell 1 that is embodied as an extruded section with integrated cooling ducts 2*a*, 2*b*, 3*a*, 3*b*, 4*a*, 4*b*, 5*a* and 5*b*. The cooling ducts 2*a* to 5*b* are arranged in pairs as cooling duct pairs 2 to 5 in the wall of the housing shell 1 that comprises an inner wall 6 and an outer wall 7. In comparison to the comparatively thick-walled corner regions 8, the central wall regions, which lie between the corner regions, or shell sections 9 of the housing shell 1 are comparatively thin-walled. For this purpose, the outer wall 7 is so to speak rectangular in shape and consequently has an almost square cross section, wherein the corner regions 8 are flattened on the outer face. The inner wall 6 likewise has an almost square cross section and is embodied with rounded inner corners 10.

The cooling ducts 2*a* to 5*b* of the cooling duct pairs 2 to 5 extend axially, in the longitudinal direction 11 of the housing, between two shell end faces 12, 13 of the housing shell 1 and extend in parallel with one another. In order to separate the cooling ducts of the cooling duct pairs 2 to 5, material separating webs or duct separating webs 2c, 3c, 4c and 5c are provided respectively between the cooling ducts 2a, 2b and 3a, 3b and also 4a, 4b and accordingly 5a, 5b in the extruded section. These material webs 2c to 5c terminate in an uninterrupted manner at the first shell end face 12, which is also referred to herein as the A-face, but in an interrupted manner on the opposite lying second shell end face 13, which is also referred to herein as the B-face (FIG. 5).

Figure 2:
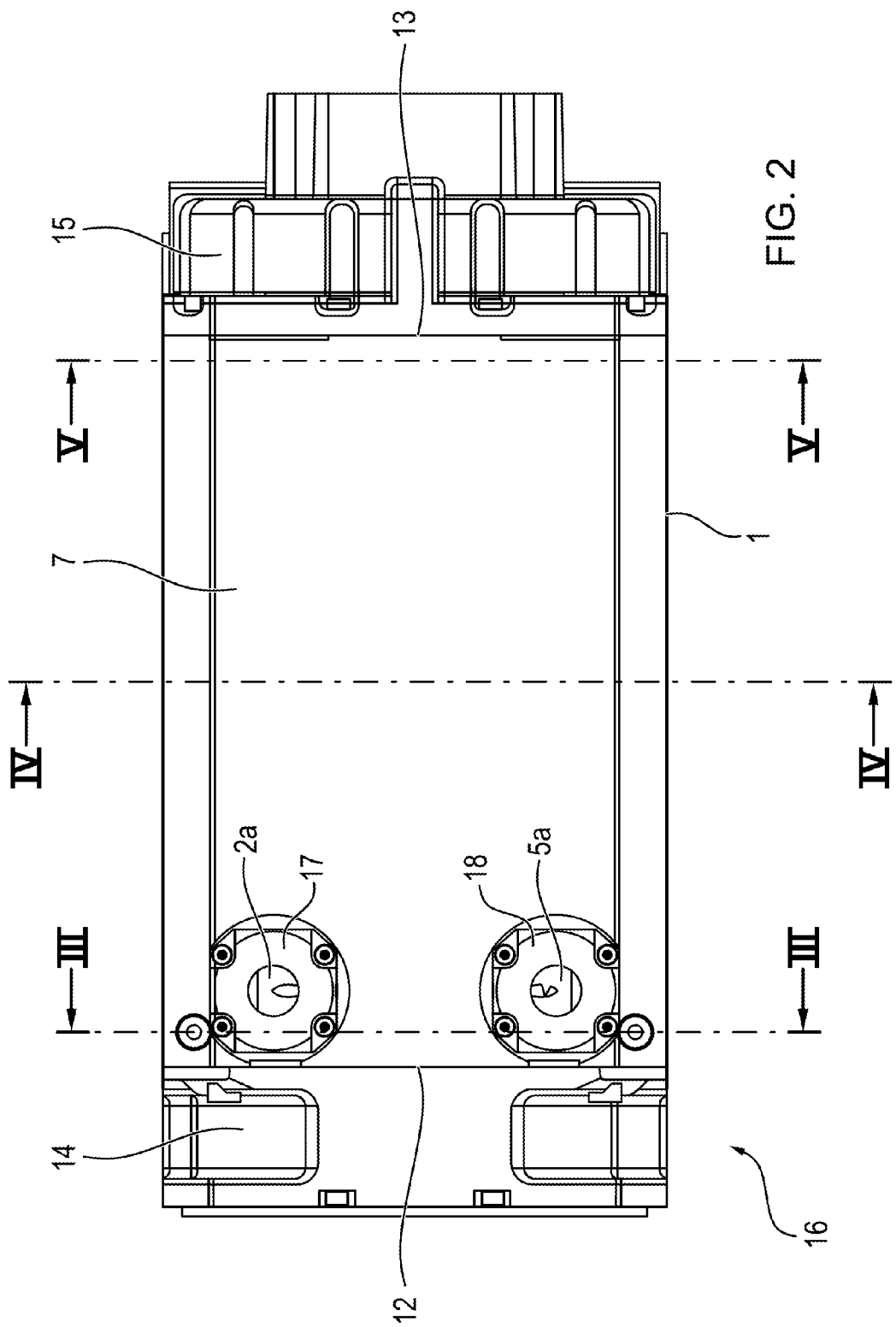
FIG. 2 illustrates the machine housing of an electric machine having a housing shell in accordance with FIG. 1 and end-face bearing end plates in a plan view of an inlet opening and an outlet opening in a duct system of the housing shell, the duct system comprising cooling ducts.

FIG. 2 illustrates the housing shell 1 that is mounted with the 'end-face end' bearing end plates 14, 15 to form a machine housing 16. The bearing end plate (A-bearing end plate) 14 is mounted on the (A-face end) shell end face 12 of the housing shell 1, whereas the bearing end plate (B-bearing end plate) 15 is mounted lying opposite on the (B-face end) shell end face 13 of the housing shell 1. An inlet opening 17 and spaced apart therefrom an outlet opening 18 are provided for the cooling medium in the region of the 'A-face end' shell end face 12. The inlet opening 17 issues in the exemplary embodiment into the cooling duct 2a whereas the cooling duct 5a issues outwards into the outlet opening 18.

Figure 3:
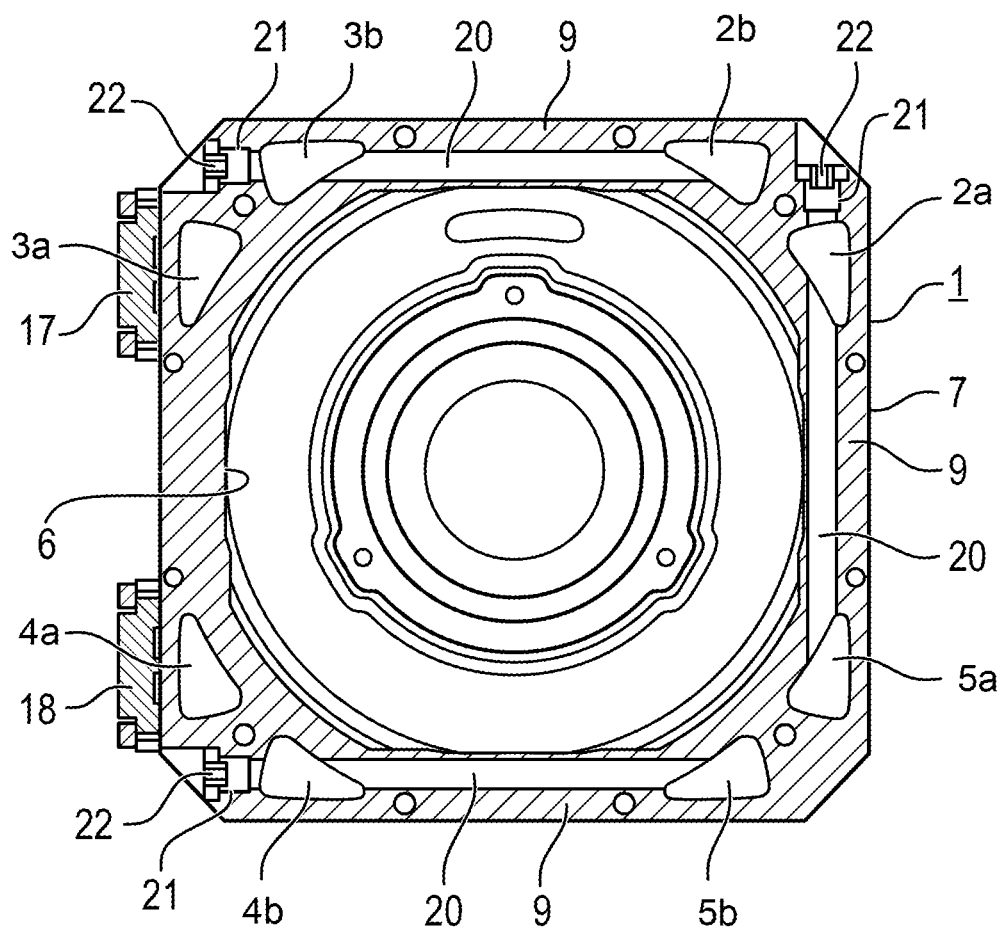
FIG. 3 illustrates a cross sectional view along the line III-III in FIG. 2 with (transverse) boreholes for connecting the cooling ducts.

FIG. 3 illustrates an enlarged cross sectional view of the housing shell 1 in the region of the 'A-face end' shell end face 12. The figure illustrates the boreholes 20 that are provided within the comparatively thin-walled wall region or rather wall sections 9 of the housing shell 1 and extend perpendicular to the cooling ducts or rather cooling duct pairs 2 to 5 and consequently in the transverse direction 19 of the housing (FIG. 1). The boreholes 20 penetrate these thin-walled wall regions 9 whilst connecting two cooling ducts of adjacent cooling duct pairs, in the exemplary embodiment of the cooling duct pairs 2 and 3, 3 and 4 and also 4 and 5, the cooling ducts lying directly opposite to one another. The boreholes 20 penetrate the outer wall 7 of the housing shell 1 at the illustrated exposed positions whilst forming corresponding borehole openings 21. These borehole openings are closed in a sealing manner by means of closing elements 22 in the form by way of example of closing screws. By virtue of these boreholes 20, connecting ducts are consequently produced between individual cooling ducts—in this example the cooling ducts 2b, 3b and 3a, 4a and also 4b—in the region of the 'A-face end' shell end face 12 of the housing shell 1.

Figure 4:
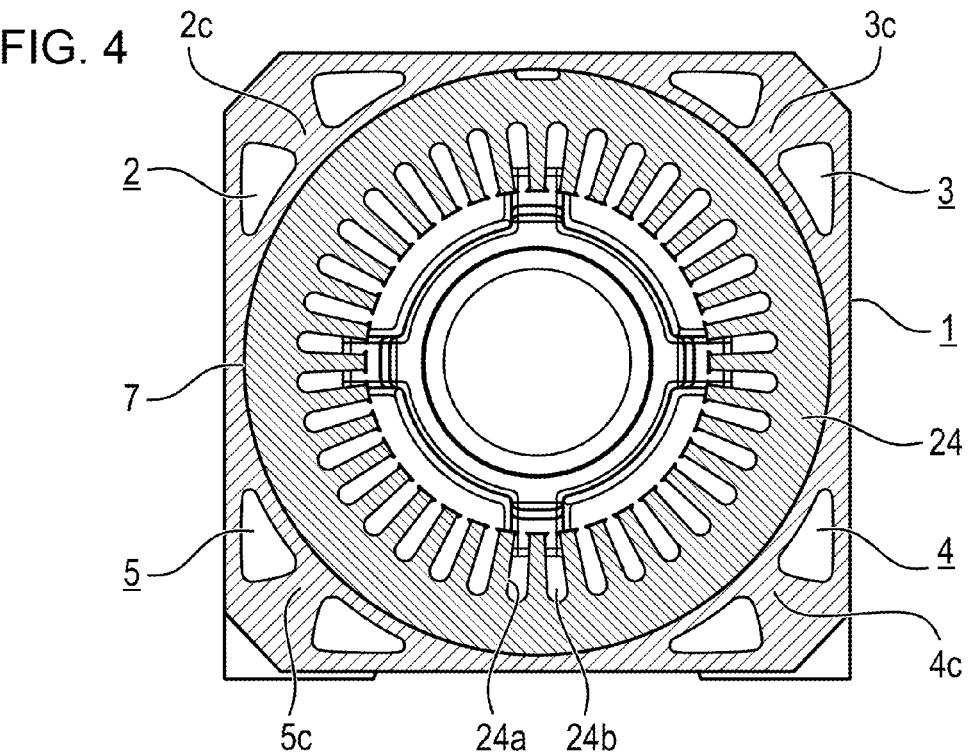
FIG. 4 illustrates a cross sectional view along the line IV-IV in FIG. 2 with a toothed stator core on the housing inner side.
Figure 5:
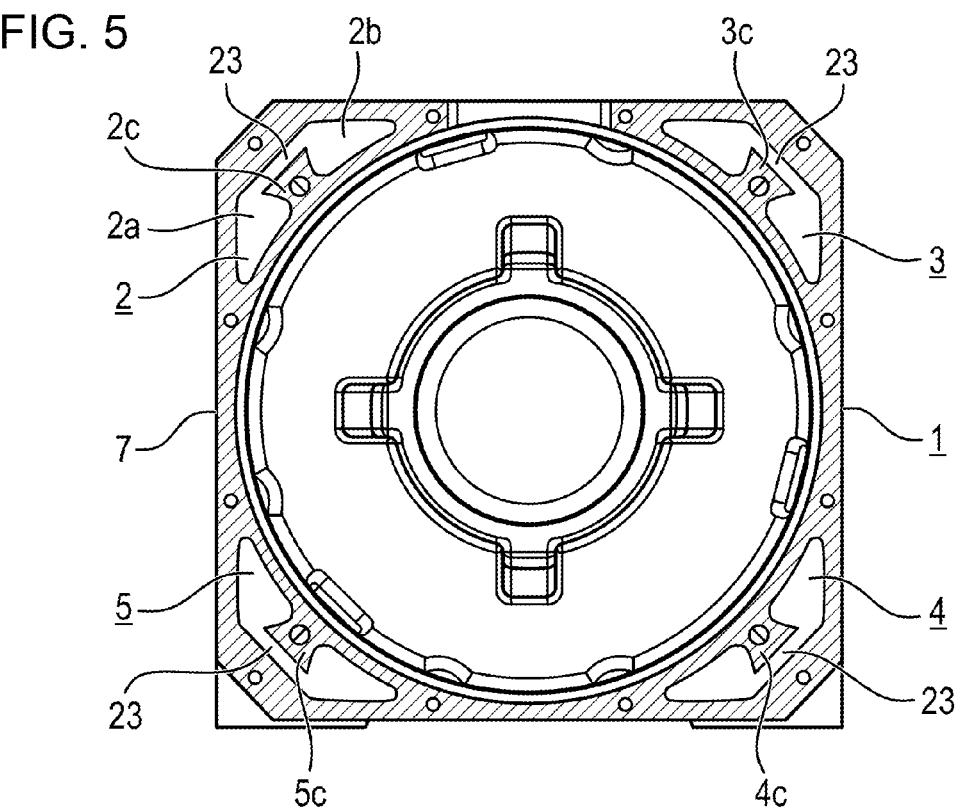
FIG. 5 illustrates a cross sectional view along the line V-V in FIG. 2 with cooling ducts of respective cooling duct pairs, the cooling ducts being connected by way of through-going ducts.

FIGS. 4 and 5 illustrate other, likewise enlarged cross sectional views of the housing shell 1. FIG. 5, similar to FIG. 3, represents the 'B-face end' region of the (second) shell end face 13. It is evident that the shell webs 2c to 5c are interrupted between the cooling ducts of the respective cooling duct pairs 2 to 5 whilst forming through-going ducts 23. All the cooling ducts 2a to 5b can communicate with one another by virtue of the connection by way of the boreholes 20 that are also described hereinunder as connecting ducts. By virtue of the different positioning of the connecting ducts 20 on the 'A-face end' shell end face 12 on the one hand and of the through-going ducts 23 on the opposite lying 'B-face end' shell end face 13 on the other hand, the cooling ducts are connected practically one after the other in the flow direction of a cooling medium and therefore, once the cooling medium has entered by way of the inlet opening 17, the cooling medium flows through the cooling ducts forming the cooling duct system one after the other and subsequently flows away by way of the outlet opening 18.

It is evident in FIG. 4 that the shell separating webs or duct separating webs 2c to 5c are uninterrupted between the 'A-face end' shell end face 12 and the through-going ducts 23 in the region of the opposite lying 'B-face end' shell end face 13 in the longitudinal direction 11 of the housing along the housing shell 1 in such a manner that, with the exception of the through-going ducts 23, no other connections are provided between the two cooling ducts of the respective cooling duct pairs 2 to 5.

FIG. 4 also illustrates a stator that is incorporated in the machine housing 16 and in particular in the housing shell 1 of the machine housing 16, the stator being in the form by way of example of a stator laminated core that comprises on the peripheral side in an alternating manner a plurality of stator teeth 24a and stator grooves 24b for receiving windings or coils of a field winding of the electrical machine that can be a motor or a generator.

Figure 6:
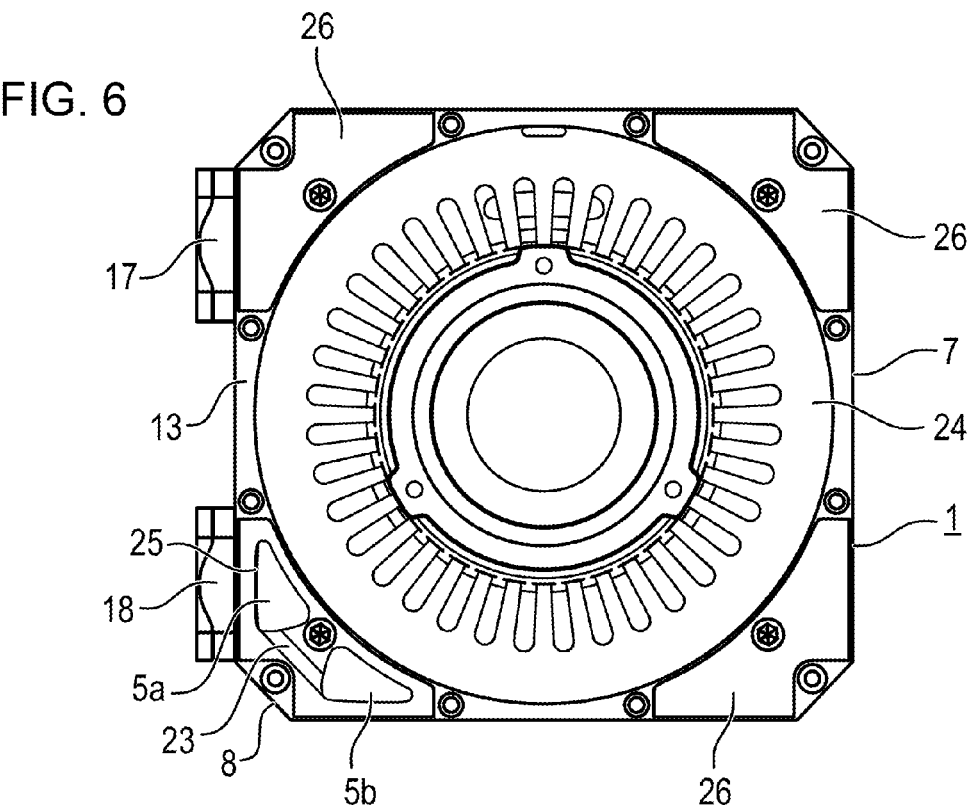
FIG. 6 illustrates an end face view of the (A-face end) shell end face of the housing shell where the bearing end plate has been removed with a view of three planar seals that are lying in the depressions and a depression where the planar seal has been removed.
Figure 7:
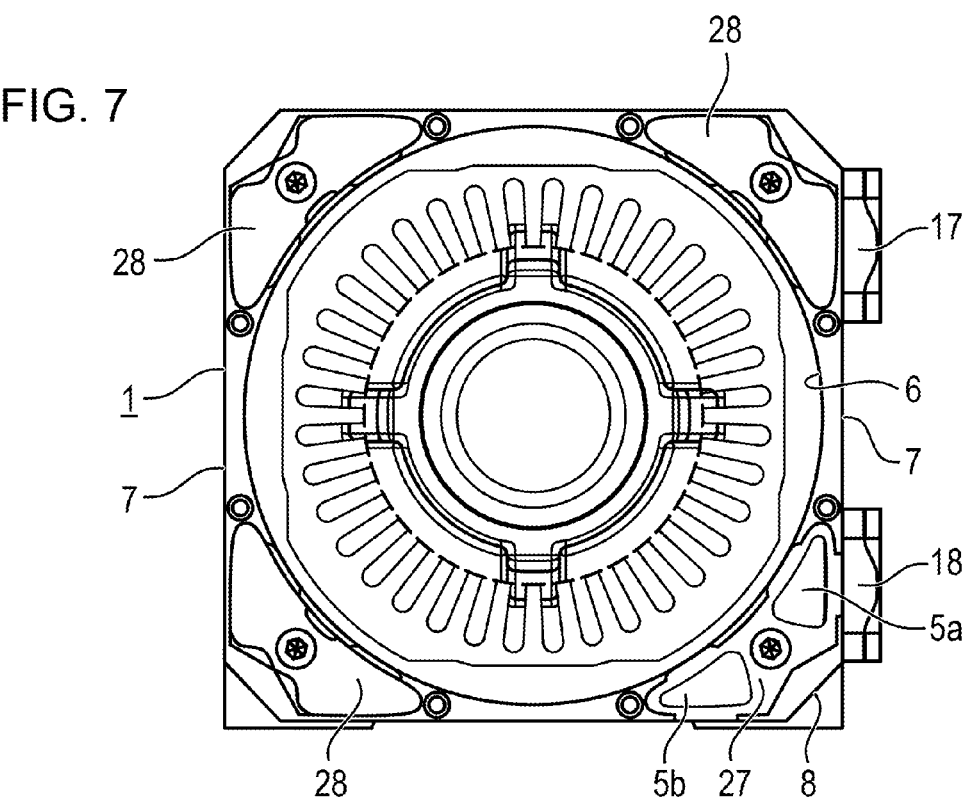
FIG. 7 illustrates a view in accordance with FIG. 6 of a planar seal arrangement on the (B-face end) shell end face of the housing shell.

FIG. 6 illustrates the machine housing 16 where the 'B-face end' bearing end plate 15 has been removed. Corrugated-like depressions 25 are incorporated in the respective shell end face 13 in the region of the cooling duct pairs 2 to 5. Flexible, elastic planar seals 26 are placed in the depressions and the planar seals cover the respective cooling ducts 2a to 5b of the respective cooling duct pairs 2 to 5. During the process of assembling the B-bearing end plate 15, the planar seals 26 are pressed at the end face against the shell housing 1 and consequently against the housing shell 1 and are elastically deformed so that a reliable sealing effect is achieved.

A corresponding sealing arrangement is also provided on the 'A-face end' shell end face 12 of the housing shell 1. Corrugated-like depressions 27 are likewise provided in the 'A-face end' shell end face 12 in the region of the cooling duct pair 2 to 5 and in turn flexible, elastic planar seals 28 are placed in the depressions. During the process of assembling the A-bearing end plate 14, these planar seals 28 are likewise pressed against the housing shell 1 and consequently against the housing shell 1 and are in turn elastically deformed to produce a reliable sealing effect.

The invention is not limited to the above described exemplary embodiment. On the contrary, the person skilled in the art can also derive therefrom other variants of the invention without departing from the subject of the invention. In particular, all the individual features that are described in connection with the different exemplary embodiments can moreover also be combined with one another in other ways without departing from the subject of the invention.

Thus, the shape of the cross section of the housing shell 1 can differ from the illustrated shape both with respect to its outer wall 7 and also with respect to its inner wall 6. By way of example, the inner wall can be cylindrical. It is also not necessary that the wall thickness of the housing shell 1 increases in the peripheral direction towards the corner regions or rather is comparatively thin-walled between the corner regions 8. On the contrary, the wall of the housing shell 1 can be uniform in the peripheral direction. It is important that cooling duct pairs 2 to 5 are provided that are spaced apart in a transverse direction 19 preferably at an equal distance from one another in such a manner that the housing shell 1 and consequently the machine housing 16 is cooled in a manner as uniform as possible.

In principle, it is also possible to provide the boreholes 20, which extend in the transverse direction 19 of the housing and form the connecting ducts, on the B-face and to provide the interruptions of the duct separating webs 2c to 5c on the A-face of the housing shell 1, the interruptions forming the through-going ducts 23.

The invention thus provides a coolable machine housing 16 of an electrical machine having a housing shell 1 that can be covered at the end face by means of bearing end plates 14, 15 and are incorporated in the number of axial cooling ducts 2a to 5b that communicate with one another by means of the connecting ducts 20, wherein the housing shell 1 is formed from an extruded section with integrated cooling ducts 2a to 5b that extend in an axial manner in pairs as cooling duct pairs 2 to 5 between the shell end faces 12, 13, and wherein the connecting ducts 20 are embodied as boreholes that penetrate the outer wall 7 as borehole opening 21 and are closed by means of the closing elements 22.

The following is a summary list of reference numerals and the corresponding structure used in the above description of the invention:
- 1 Housing Shell
- 2-5 Cooling Duct Pair
- 2a-5b Cooling Duct
- 6 Inner Wall
- 7 Outer Wall
- 8 Corner Region
- 9 Wall Region/Wall Section
- 10 Inner Corners
- 11 Longitudinal Direction of the Housing
- 12 'A-face end' (first) Shell End Face
- 13 'B-face end' (second) Shell End Face
- 14 A-Bearing End Plate
- 15 B-Bearing End Plate
- 16 Machine Housing
- 17 Inlet Opening
- 18 Outlet Opening
- 19 Transverse Direction of the Housing
- 20 Borehole/Connecting Duct
- 21 Borehole Opening
- 22 Closing Element/Closing Screw
- 23 Through-going Duct
- 24 Stator
- 24a Stator Tooth
- 24b Stator Groove
- 25 'B-face end' Depression
- 26 Planar Seal
- 27 'A-face end' Depression
- 28 Planar Seal

The invention claimed is:

1. A machine housing for receiving stator components and rotor components of an electrical machine, the machine housing comprising:
  a housing shell being an extruded section formed with an inner wall, an outer wall, a first shell end face and a second shell end face opposite said first shell end face;
  bearing end plates configured to cover said housing shell at each of said first and second shell end faces;
  said extruded section of said housing shell having integrated therein a plurality of axial cooling ducts between said inner wall and said outer wall, said cooling ducts extending in pairs as cooling duct pairs in a longitudinal direction of said housing between said shell end faces;
  said cooling ducts communicating with one another by way of connecting ducts that extend in a transverse direction of the housing, said connecting ducts being boreholes that penetrate said outer wall as borehole openings, said boreholes forming said connecting ducts penetrating a first cooling duct of a first said cooling duct pair in the transverse direction of said housing and issuing into a second cooling duct of an opposite lying second said cooling duct pair, and said borehole openings being closed by closing elements.

2. The machine housing according to claim 1, wherein said cooling ducts enter or exit at the respective shell end face of said housing shell.

3. The machine housing according to claim 1, which comprises a duct separating web extending in the longitudinal direction of said housing between said cooling ducts of the respective said cooling duct pair, the duct separating web being uninterrupted at said first shell end face and being interrupted at said second shell end face and forming a through-going duct.

4. The machine housing according to claim 3, wherein said boreholes forming said connecting ducts are provided in a region of said first shell end face lying opposite said through-going ducts.

5. The machine housing according to claim 1, wherein an inlet opening and an outlet opening are formed in a region of said first shell end face and each of said inlet and outlet openings penetrate said outer wall and communicate with a respective said cooling duct.

6. The machine housing according to claim 1, which comprises a plurality of planar seals covering and sealing respective shell end face end inlets or outlets of said cooling ducts.

7. The machine housing according to claim 6, wherein a number of said planar seals corresponds to a number of said cooling duct pairs.

8. The machine housing according to claim 6, wherein said first shell end face is formed with a plurality of depressions in a region of the respective said cooling ducts, a number of said depressions corresponding to a number of said cooling duct pairs, and said planar seals are placed in said depressions for closing said cooling ducts at end faces thereof.

9. The machine housing according to claim 8, wherein said second shell end face is formed with a plurality of depressions in a region of the respective said cooling ducts, a number of depressions corresponding to a number of the cooling duct pairs, and said planar seals are placed in said depressions for closing said cooling ducts at end faces thereof.

10. The machine housing according to claim 6, wherein said second shell end face is formed with a plurality of depressions in a region of the respective said cooling ducts, a number of depressions corresponding to a number of the cooling duct pairs, and said planar seals are placed in said depressions for closing said cooling ducts at end faces thereof.

11. The machine housing according to claim 6, wherein said planar seals are pressed between the respective said shell end face and said bearing end plate allocated thereto, while sealing said end face of said cooling ducts.

* * * * *